Sept. 27, 1927.　　　　　H. L. BROWNBACK　　　　　1,643,603
　　　　　　　　　INTERNAL COMBUSTION ENGINE
　　　　　　　　　　Filed Nov. 22, 1923　　　3 Sheets-Sheet 2
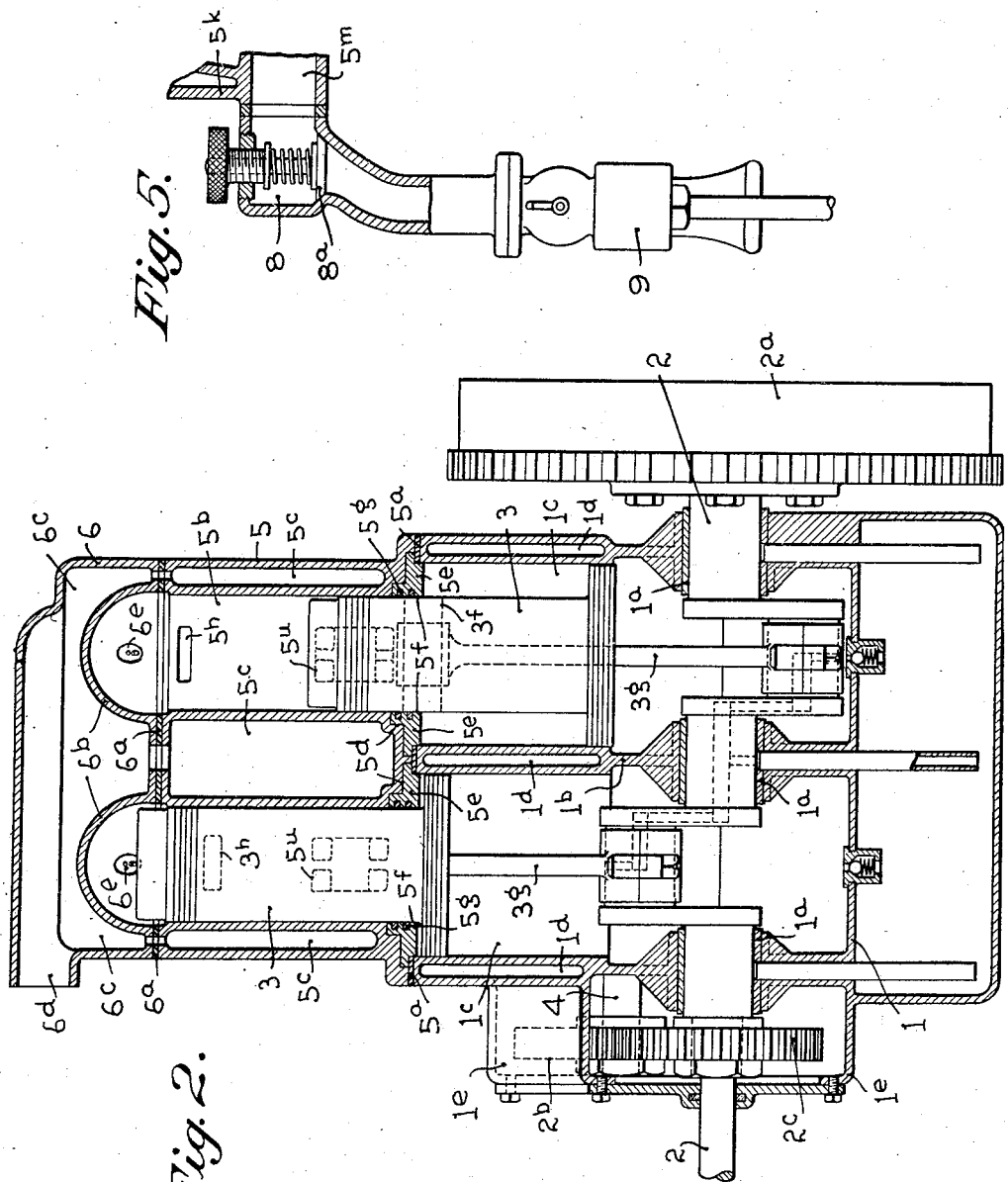

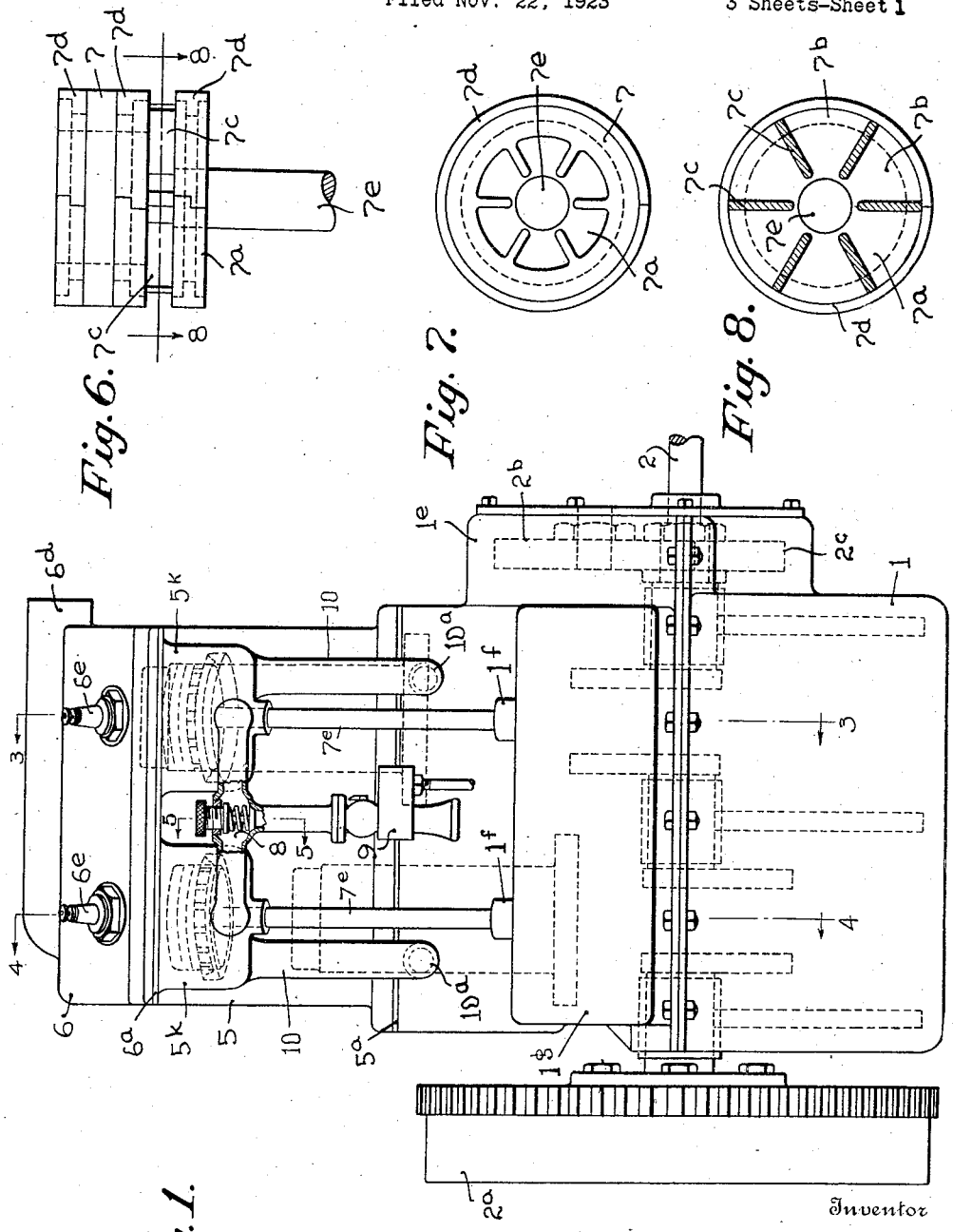

Sept. 27, 1927. 1,643,603
H. L. BROWNBACK
INTERNAL COMBUSTION ENGINE
Filed Nov. 22, 1923 3 Sheets-Sheet 3
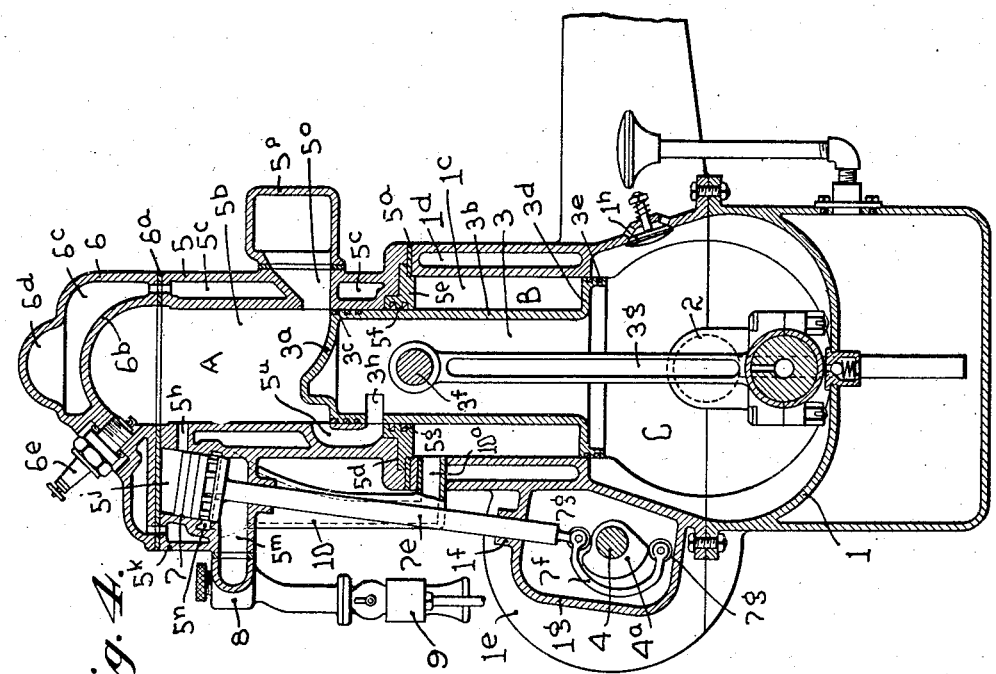
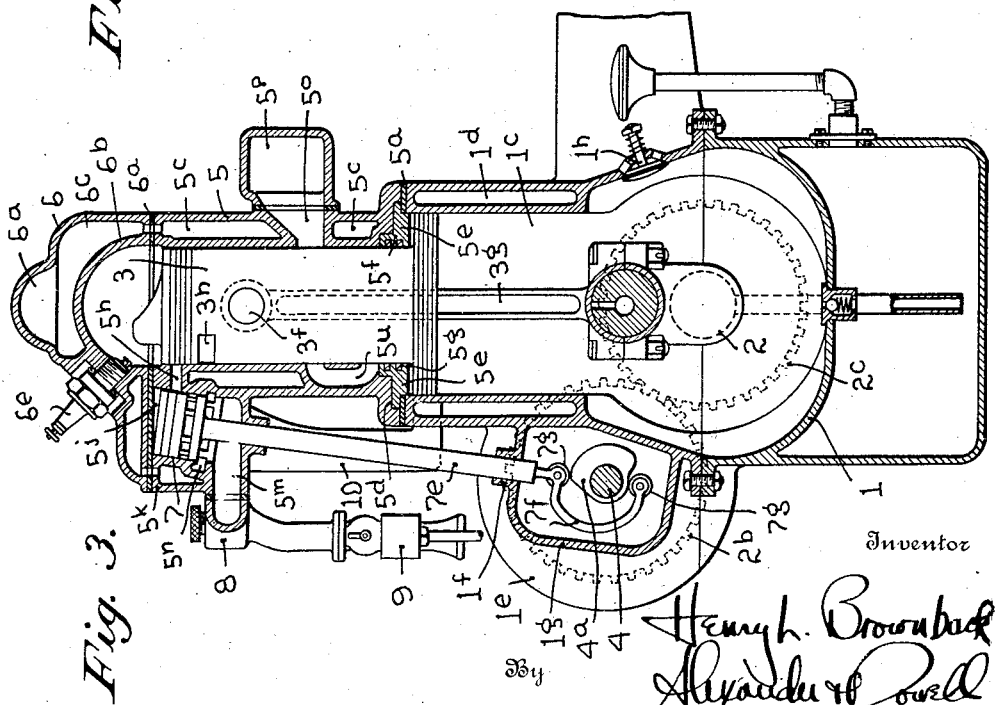
Inventor
Henry L. Brownback
By Alexander H. Powell
Attorneys.

Patented Sept. 27, 1927.

1,643,603

UNITED STATES PATENT OFFICE.

HENRY LOWE BROWNBACK, OF NORRISTOWN, PENNSYLVANIA.

INTERNAL-COMBUSTION ENGINE.

Application filed November 22, 1923. Serial No. 676,463.

This invention is an improvement in 2-cycle internal combustion engines having one or more units, and the principal object of the invention is to provide a novel 2-cycle engine each cylinder thereof being stepped, and housing a stepped differential piston, the upper or smaller end of each cylinder being adapted to act as the firing, compression, or working chamber; the space between the bottom of the piston and lower end of the working cylinder being adapted to act as the pre-compression, suction, or charging chamber, and the space included in the crank case, below the piston being adapted to form the air compression chamber, said pistons being connected to a connecting rod, scotch yoke, or other device adapted to convert the reciprocating motion of the piston into rotary motion of the crank shaft.

Another object of the invention is to provide a novel 2-cycle internal combustion engine provided with exhaust or escape valves or ports opening into the working chamber at or near the lower end of the working stroke of the piston; and provided with a valve, or valves, of the slide, poppet, rotary, or piston types, said valve or valves being operated automatically or mechanically, to admit hydrocarbon vapor and air, or oxygen into the pre-compression chamber during the whole or a part of the working stroke of the piston; said engine being also provided with a valve, or valves connecting the pre-compression chamber with the working chamber during a part or the whole of the return stroke of the piston.

A further object of the invention is to provide an internal combustion engine in which hydrocarbon vapors or gases, and air or oxygen are compressed and burned above a piston, the waste or spent gases in the working cylinder after ignition, escaping to the atmosphere through a valve or port at or near the end of the down or working stroke of the piston while new vapors or gases, or vapors and gases mixed with oxygen or air, are being drawn or driven by atmospheric or mechanical pressure into the pre-compression chamber, while during the upstroke, or compressing and charging stroke of the piston, a portion of the vapors or gases are mixed with the air or oxygen compressed in the working chamber, the remaining portion of such vapors being forced into the aspirating pre-compression chamber of one of the other units.

A still further object is to provide a novel 2-cycle internal combustion engine in which air is drawn or forced into the air compression chamber on the up-stroke of the piston, and is compressed therein on the down stroke, and forced into the working cylinder during a portion, or all of the duration of the escapement of waste or exhaust gases from the working chamber, thereby scavenging and cooling said working chamber.

In my novel 2-cycle internal combustion engine the displaced volume of gases contained in the pre-compression chamber is preferably in excess of that in the working chamber, and is also at higher pressure; and the air in the air compressing chamber is of greater displaced volume than the volume of the working chamber; also the displacement of the pre-compression chamber is greater than that of the working chamber.

Other minor objects of the invention will be hereinafter set forth.

I will explain the invention with reference to the accompanying drawings which illustrate one practical embodiment thereof to enable others to adopt and use the same, and will summarize in the claims the essential features of the invention, the novel constructions, and novel combinations of parts for which protection is desired.

In the drawings:

Fig. 1 is a front elevation of my novel 2-cycle internal combustion engine.

Fig. 2 is a vertical longitudinal section through the engine.

Fig. 3 is a transverse section on the line 3—3 Fig. 1, showing the piston in the "up" position.

Fig. 4 is a section on the line 4—4 Fig. 1 showing the piston in the "down" position.

Fig. 5 is a section on the line 5—5, Fig. 1.

Fig. 6 is an elevation of the main valve of the engine.

Fig. 7 is a top plan view of said valve.

Fig. 8 is a section on the line 8—8, Fig. 6.

As shown in the drawings, my novel engine comprises a base casting 1, adapted to house the crank shaft 2 of the engine, which shaft is housed in suitable bearings 1ᵃ in the casting in the usual manner. The engine consists of one or more units, two units being shown in the drawings and hence an intermediate partition 1$^b$ is provided within the base casting 1, to separate the crank cases of said units, and the intermediate partition 1$^b$ is also provided with a bearing 1$^a$ adapted to house the crank shaft 2. The crank cases and their bearings 1$^a$ are preferably made air-tight to prevent the escape of air from the ends of the casing, and to prevent the passage of air from one crank space to the other past the intermediate partition 1$^b$.

Each half of the casting 1 is provided with a cylinder bore 1$^c$ adapted to house the lower enlarged end of a hollow stepped or differential piston 3, as hereinafter set forth. Suitable water ducts 1$^d$ are formed around the cylinders 1$^c$ for the purpose of cooling same.

On one end of shaft 2 is mounted the fly wheel 2$^a$, and on the other end of the shaft 2, adjacent the opposite end of the casting 1, are mounted the timing gears 2$^b$, 2$^c$, which drive the cam shaft 4, said gears being preferably housed in a suitable housing 1$^e$ integral with the casting 1.

Upon the casting 1 is mounted a cylinder casting 5 which is preferably detachably attached to the casting 1 in the usual manner. Preferably a gasket 5$^a$ is interposed between the castings 1 and 5 in order to make a gas-tight connection therebetween. Casting 5 is provided with cylinder bores 5$^b$, which cylinder bores are disposed in axial alignment with, but are smaller in diameter than said cylinder bores 1$^c$, cylinder bores 1$^c$ and 5$^b$ thus forming stepped cylinders within the castings 1 and 5. Preferably, water ducts 5$^c$ are provided around the cylinders 5$^b$ for the purpose of cooling said cylinders.

In the bottom face of the casting 5, concentric with the cylinder bores 5$^b$ are provided annular recesses 5$^d$ adapted to receive plates 5$^e$ provided with bores 5$^f$ of the same diameter as the cylinder bores 5$^b$. In the bores 5$^f$ are provided the usual annular recesses to receive stuffing rings 5$^g$ adapted to contact with the wall of the piston 3 to prevent passage of vapors or air from cylinder 5$^b$ to the cylinder 1$^c$, and vice-versa.

Upon the casting 5 is detachably attached a cylinder head 6, and between casting 5 and head 6 is a gasket 6$^a$ in the usual manner. In the bottom face of head 6 are two semispherical chambers 6$^b$ concentric with the axes of the cylinder bores 5$^b$ and 1$^c$, said chambers 6$^b$ closing the tops of the cylinders 5$^b$. Around the chambers 6$^b$ is a water duct 6$^c$ having an inlet 6$^d$, and water ducts 6$^c$ communicate with water ducts 5$^c$ in casting 5 by means of registering perforations in the said ducts at their meeting faces. Extending through the head 6 and into each depression 6$^b$ are spark plugs 6$^e$ adapted to ignite the charge in the working cylinders 5$^b$.

As shown in Fig. 4 each piston 3 is preferably hollow and is closed at its upper end 3$^a$, and the body of the piston comprises a tubular portion 3$^b$ of suitable diameter to make a close sliding fit in the cylinder bores 5$^b$, the upper end of said body portion 3$^b$ being provided with the usual piston rings 3$^c$. The upper end of each piston 3 is adapted to fit within a cylinder bore 5$^b$, and the lower open end of the piston 3 extends below the casting 5 and into the bores 1$^c$ of the base casting 1, and the lower end of said piston 3 is provided with an exterior circumferential flange 3$^d$ of diameter to suit the bore 1$^c$, and the outer periphery of flange 3$^d$ is provided with annular recesses for the reception of stuffing rings 3$^e$ to prevent passage of the air or vapors therepast. Adjacent the top of the piston 3 is a hinge bar 3$^f$ upon which is pivotally mounted the upper end of the connecting rod 3$^g$, connecting said piston with the crank shaft 2.

Hence, the piston 3 and the castings 1, 5 and 6 form three chambers A, B, C, (see Fig. 4) the space above the piston 3 and within the bore 5$^b$ below the head 6 forming the firing, or working chamber A of the engine; the space exterior to the piston wall 3$^b$ and within the bore 1$^c$ and included between the casting 5$^e$ and the flange 3$^d$ of piston 3, forming the fuel pre-compressing and suction or charging chamber B; and the crank space, the interior of the piston 3, and the bore 1$^c$ of the casting 1 below the piston flange 3$^d$, forming the air compression chamber C. As the piston reciprocates the respective capacities of the chambers A, B, and C are varied accordingly.

The fuel vapors or gases are admitted into the firing or working cylinder A through a port 5$^h$ in the side of each cylinder bore 5$^b$ adjacent the top thereof, which port 5$^h$ may be opened and closed by means of a suitable valve 7, of any suitable type, such as a slide, rotary, poppet, or piston valve, the particular valve 7 shown in the drawings being a piston valve operating in a cylinder bore 5$^j$ in an extension 5$^k$ integral with the cylinder casting 5. Bore 5$^j$ is preferably closed at its top by means of the cylinder head 6, and suitable water ducts may be provided around bore 5$^j$ as shown, said ducts being fed by means of registering perforations in the adjacent meeting faces of said parts 5$^k$ and 6. Port 5$^h$ communicates, as shown, with the bore 5$^j$, and the lower end of bore 5$^j$ terminates in an outwardly extending passage 5$^m$ adapted to be engaged by a manifold 8 to which is connected the carburetor 9. Within the bore 5$^j$ above the passage 5$^m$ but below port 5$^h$ is an annular recess 5$^n$, which is connected to and communicates with a pipe or duct 10 leading from said annular recess 5$^n$ to the fuel ports 10ª at the top of the fuel pre-compression chamber B.

Piston valve 7, as shown in Figs. 6, 7 and 8 is preferably tubular, and is open at the top, but closed at the bottom by a plate 7ª. In the side of the valve 7, above the base plate 7ª, are a plurality of circumferentially disposed openings 7ᵇ communicating with the hollow interior of the valve. If desired, suitable radially disposed vanes 7ᶜ may be formed on the upper side of plate 7ª to direct the fuel vapors, passing into openings 7ᵇ, toward the center of the valve. Piston rings 7ᵈ are preferably mounted on the wall of said piston valve, and also on the base plate 7ª, to prevent passage of fuel vapors or gases past the valve 7 except through the interior thereof.

Valve 7 is reciprocated in the bore 5ʲ, to open and close port 5ʰ and to bring the openings 7ᵇ of valve 7 in or out of register with the annular recess 5ⁿ, by means of a rod 7ᵉ entering and housed in the lower part of casting 5ᵏ, which rod 7ᵉ is preferably tapped into the base plate 7ª of valve 7. Rod 7ᵉ may be reciprocated by any suitable means. As shown, the lower end of rod 7ᵉ is slidably mounted in a bearing 1ᶠ on a cam-shaft housing 1ᵍ, the lower end of said rod 7ᵉ extending adjacent the cam-shaft 4. On the lower end of rod 7ᵉ is a yoke 7ᶠ carrying rollers 7ᵍ adapted to engage a cam 4ª mounted on said cam-shaft 4. As cam 4ª is revolved the valve 7 will accordingly be raised or lowered.

When valve 7 is raised, as in Fig. 3, the port 5ʰ to the working chamber A is closed by the sides of said valve, and the gases from the carburetor 9 may pass from manifold 8 through passage 5ᵐ, into the annular recess 5ⁿ and down into pipe 10, and from hence into the pre-compression chamber B, but the gases cannot pass upwardly through valve 7 and into chamber A through the ports 5ʰ. When however valve 7 is in lowered piston, as shown in Fig. 4, the gases from chamber B may pass upwardly through ports 10ª and pipe 10, into annular recess 5ⁿ, through openings 7ᵇ in valve 7, up through valve 7, and through port 5ʰ into the working chamber A, but the gases cannot pass back into the carburetor 9 since plate 7ª of valve 7 blocks the communication between annular recess 5ⁿ and passage 5ᵐ.

An exhaust port 5° is located in the side of cylinder 5ᵇ at a point adjacent the lower limit of travel of the piston 3, as shown in Figs. 3 and 4, said exhaust port 5° exhausting either into the atmosphere, or through an exhaust manifold 5ᵇ into a suitable muffler (not shown). When the top 3ª of the piston 3 passes the port 5° the said port will be opened or closed depending on whether the piston is moving down or up.

Piston 3 is preferably hollow and is provided with an opening 3ʰ in the side thereof adjacent the top end 3ª, said opening being adapted to register with a U-shaped port 5ᵘ in the side wall of the cylinder 5ᵇ, the outlet of said port being preferably diametrically opposite and in line with the exhaust port 5°. The air compression chamber C is provided with an inwardly opening air valve 1ʰ adapted to be opened by suction within the chamber C on the up-stroke of the piston 3, to admit air into said chamber. The air in chamber C will then be compressed on the down-stroke of the piston 3, and when the opening 3ʰ in the upper end of the piston 3 registers with the port 5ᵘ in the lower end of the cylinder bore 5ᵇ, at the end of the working stroke of the piston, the compressed air in the chamber C will rush out through port 5ᵘ into the working chamber A and thoroughly scavenge and cool said working chamber forcing out all the waste products of combustion from said working chamber A.

Valve 7 connecting the pre-compressor chamber B with the working chamber A is never open at the same time that the exhaust port 5° is open.

The mixture in the pre-compression chamber B is rich, and the mixing of the gases therefrom with the compressed excess air in the working cylinder A forms the explosive mixture for the engine.

Manifold 8, see Figs. 4 and 5 is preferably provided with an upwardly opening valve 8ª at its connection of the carburetor 9, to prevent the back flow of hydrocarbon vapors from the pre-compressor chamber B towards the working cylinder A, due to valve 7 closing before the piston 3 finishes its upstroke, and hence connecting duct 10 with passage 5ᵐ before the finish of up stroke. The gases thus forced back into manifold 8 are trapped in manifold 8 and may be led into the pre-compression chambers B of the other engine units which are aspirating at that time.

Also, a duct (not shown) may be formed in the passage 10 between the pre-compressor B and firing cylinder A, into which all of the compressors may pump, said duct preferably having a cubical capacity of less than one compressor, and the gas from this duct may be lead into the firing cylinder A during any portion of the up stroke of the piston after the closing of the exhaust port 5°.

*Operation.*

The operation of the engine is as follows:
The engine shown is of the 2-cycle two unit type and the cranks of the crank shaft are hence angularly spaced 180° apart, hence when one piston is in "up" position, the other piston is in "down" position. Obviously the engine could be designed to have one unit, or as many units may be added thereto as desired without departing from the scope of the invention.

With one of the cylinders as in Fig. 3, in the firing position its piston is at its upper limit of travel and all valves are closed, valve 6 being in its uppermost position closing the port 5$^h$. As the piston is forced downward by explosion the fuel vapors are sucked through the ports 5$^m$, 5$^n$, 10 and 10$^a$ into the aspirating pre-compression chamber B until the lower end of valve 6 has been lowered by the action of cam shaft 4 to block the passage from port 5$^m$ into duct 10. During the down stroke of the piston 3 the air in the chamber C is being highly compressed When the upper end of the piston 3 unseals the exhaust port 5$^o$ near or at the end of the down stroke of the piston, the waste or burnt gases will be exhausted from the working cylinder into the atmosphere or exhaust manifold 5$^p$, while the port 5$^h$ is closed by the valve 7.

While the exhaust port 5$^o$ is still open the piston continues its down-stroke until the opening 3$^h$ in the upper side of the piston 3 registers with the duct 5$^u$ in the cylinder wall 5$^b$, at which time the compressed air in the air compression chamber C is allowed to escape through the opening 3$^h$ and duct 5$^u$ into the working cylinder A opposite the exhaust port 9, during the whole or a portion of the duration of the escapement of waste or exhaust gases from the working cylinder A, thereby thoroughly scavenging and cooling the working cylinder.

Upon the beginning of the upstroke, the duct 5$^u$ and exhaust port 5$^o$ are closed by the piston 3, and air is sucked into the air-compression chamber C through valve 1$^h$. Valve 6 then drops into lower position closing the passage between port 5$^m$ and duct 10, and allowing the compressed fuel vapors to be forced though duct 10, through the valve 7 and through port 5$^h$, into the working cylinder A where it is mixed with the compressed excess air in the working chamber which air has been compressed by the upward movement of the piston 3.

The piston continues its upward movement, but before reaching the top of its travel valve 7 closes, forcing the gases back into the passage 5$^m$ and manifold 8, but the valve 8$^a$ prevents the vapors from being forced back into the carburetor 9. The gases in the manifold 8 are then led into the aspirating pre-compression cylinders B of the other engine units.

The piston then finishes its upward stroke, and the fuel vapors and air therein are fully compressed, and ready for ignition at the beginning of the next working stroke.

What I claim is:—

1. For an internal combustion engine having a working cylinder and having a fuel pre-compression cylinder; a valve casing closed at both ends; a port adjacent the lower end of the casing communicating with a carburetor; a port adjacent the upper end of said casing communicating with said working cylinder; said casing having an annular recess in its walls intermediate said ports and communicating with said pre-compression cylinder; a tubular piston reciprocably mounted in said casing above said first mentioned port and having its lower end closed; said piston having openings in its walls adapted to register with said annular recess; and means for shifting said valve to establish communication between said lower port and annular recess, or between said upper port and annular recess.

2. For a multiple unit internal combustion engine, each unit comprising a working cylinder and a fuel pre-compression cylinder; a valve for each unit comprising a cylindrical casing closed at both ends; a port in said casing adjacent its lower end communicating with a carburetor; a port in said casing adjacent the upper end of said casing communicating with said working cylinder; said casing having an annular recess in its walls intermediate said ports and communicating with said pre-compression cylinder; a tubular piston reciprocably mounted in said casing above said first port and having its lower end closed; and having openings in its walls adapted to register with said annular recess; radially disposed vanes within said piston for directing the vapors towards the center of said piston; and a piston rod on said piston actuated by said engine cam shaft for shifting said piston to establish communication between said lower port and annular recess, or between said upper port and annular recess.

3. A multiple unit internal combustion engine, each unit comprising the combination of a working cylinder, a fuel pre-compression cylinder, and an air compression cylinder all in axial alignment; a differential piston reciprocably mounted in each unit; means for admitting air into the air compression cylinders on the return strokes; a valve for each unit for admitting fuel vapors from a carburetor manifold into the fuel precompression cylinders during the working strokes; said pistons compressing the air in the air compression cylinders on the working strokes; an exhaust port for exhausting the waste products of combustion from each working cylinder at the end of the working stroke; means for admitting compressed air into the working cylinders to scavenge and cool same during the escapement of waste products of combustion from said working cylinder; said pistons compressing the fuel vapors in the pre-compression cylinders during the return strokes; means for shifting said valve to admit part of the compressed fuel vapors into the working cylinder during part of the return stroke; and means for shifting said valve to direct the remaining part of said compressed vapors back into the said manifold; and a check valve in said manifold for directing said vapors into the aspirating pre-compression cylinder of other units.

4. In combination with an engine as set forth in claim 3, each valve comprising a casing closed at both ends; a port in said casing adjacent its lower end communicating with said carburetor; a port in said casing adjacent its upper end communicating with said working cylinder; said casing having an annular recess in its walls intermediate said ports and communicating with said pre-compression cylinder; a tubular piston reciprocably mounted in said casing above said first port and having its lower end closed, and having openings in its walls adapted to register with said annular recess; radially disposed vanes within said piston for directing the vapors towards the center of said piston; and said means for shifting said valve comprising a rod on said piston actuated by the engine cam shaft for shifting said valve to establish communication between said lower port and annular recess, or between said upper port and annular recess.

In testimony that I claim the foregoing as my own I affix my signature.

HENRY LOWE BROWNBACK.